United States Patent [19]

Komatsu

[11] Patent Number: 5,640,568

[45] Date of Patent: *Jun. 17, 1997

[54] INLINE EXPANSION METHOD FOR PROGRAMMING LANGUAGES HAVING ARRAY FUNCTIONS

[75] Inventor: Hideaki Komatsu, Yokohama, Japan

[73] Assignee: International Business Machines Corporation, Armonk, N.Y.

[*] Notice: The term of this patent shall not extend beyond the expiration date of Pat. No. 5,485,619.

[21] Appl. No.: 344,423

[22] Filed: Nov. 22, 1994

[30] Foreign Application Priority Data

Nov. 26, 1993 [JP] Japan .................................... 5-296269

[51] Int. Cl.⁶ ...................................................... G06F 9/45
[52] U.S. Cl. ........................... 395/705; 395/706; 395/709
[58] Field of Search ..................................... 395/700, 705, 395/709, 706

[56] References Cited

U.S. PATENT DOCUMENTS

| | | | |
|---|---|---|---|
| 5,347,654 | 9/1994 | Sabot et al. | 395/600 |
| 5,450,313 | 9/1995 | Gilbert et al. | 364/133 |
| 5,475,842 | 12/1995 | Gilbert et al. | 395/700 |
| 5,485,619 | 1/1996 | Lai et al. | 395/700 |

FOREIGN PATENT DOCUMENTS 58-149569  9/1983  Japan .............................. G06F 15/347

*Primary Examiner*—Kevin A. Kriess
*Assistant Examiner*—Kakali Chaki
*Attorney, Agent, or Firm*—Paik Saber

[57] ABSTRACT

To provide inline expansion universally applicable to a variety of formulas as combinations of array functions and array operations with a programming language such as APL or FORTRAN 90 having array functions, without the need to prepare individual templates or macros. In the method of the present invention, a transformational intrinsic function (TIF) formula is analyzed during compilation and a template for inline expansion is generated. The template for inline expansion is mapped to an actual array, and macro-processing is used in generating the template. According to this method, an arbitrary combination of TIFs can be inline-expanded by simply preparing one macro-template for each TIF.

10 Claims, No Drawings

INLINE EXPANSION METHOD FOR PROGRAMMING LANGUAGES HAVING ARRAY FUNCTIONS

Background of the Invention

1. Technical Field

The present invention generally relates to compiler optimization and, specifically, relates to an inline expansion method for compiler programming languages such as APL and FORTRAN 90 having array operation functions.

2. Description of the Background Art

In the case of general programming languages, an operation on data (having a single value) of an element is described irrespective of whether it is directed to a scalar variable, array, or structure. APL, FORTRAN 90, etc., describe both an operation on an element of an array and operation on the array itself. Scalar and array expressions of the same array operation by FORTRAN 90 are shown below.

Scalar expression of an array operation:

```
DO I=10,90
    A(I) = B(I+1) + 1
END
```
(Formula 1)

Array expression of the array operation:

$A(10:90)=B(11:91)+1$ (Formula 2)

The use of an array expression has the following two advantages:

An operation can be described simply and logically.

Parallelism associated with an operation or process can be described naturally.

The first advantage enables a program to be described and understood more easily. The second advantage provides more opportunities for describing a program in parallel for parallel-processible computers such as vector and parallel computers.

General scalar processors which do not have parallel processing functions cannot execute a program in parallel. In some cases processing efficiency is low, with no program conversion for scalar processing. This conversion from a program written in array representation to a program which enables a scalar processor to work efficiently is called "scalarizing."

There are three methods of Scalarizing optimization:

(1) Inline expansion of intrinsic functions;

(2) Reduced number of array temporaries; and (3) Improved loop efficiency

In the inline expansion of intrinsic functions method, which is also carried out in existing compilers, the processing speed is increased by executing inline-expanded code instead of calling a subroutine.

In the reduction of the number of array temporaries method, scalarizing an array expression requires, an array temporary to store array values on the right hand side of an equation. The number of array temporaries is reduced by analyzing dependency and inverting direction of loops. An example is given below.

Original array expression:

$A(10:90)=A(1:81) B(10:90)$ (Formula 3)

Code obtained by simple inline expansion:

```
DO I=10,90
    T(I) = A(I−9) − B(I)   Substitution into an array temporary
END DO
DO I=10,90
    A(I) = T(I)   Substitution into a true array
END DO
```
(Formula 4)

Reduction of the number of array temporaries by loop inversion:

```
DO I=90,10,−1
    A(I) = A(I−9) − B(I)
END DO
```
(Formula 5) (5)

In the improved loop efficiency method, loop overhead is reduced by executing a plurality of array expressions by a single loop.

Of the above three optimization methods, inline expansion of intrinsic functions is most effective. In languages such as FORTRAN 90 that support array expressions, transformational intrinsic functions (TIFs), reduction intrinsic functions (RIFs), etc., must be inline-expanded in addition to ordinary intrinsic functions. TIFs do array transformations such as shifting, rotation, transposition, enlargement, merging, and packing. RIFs receive an array and return scalar values such as maximums, minimums, and counts.

An example of inline expansion for an intrinsic function is shown below.

In the program below, array B spreads three-dimensionally to generate a 10×100×200 array (Formula 6), array C spreads two-dimensionally to generate a three-dimensional array of the same size, then the two arrays thus generated are added together (Formula 7). Elements are added in the first dimension direction to generate an array of 100 ×200, which is then substituted into array A.

To convert this program simply, three three-dimensional temporary arrays are needed. An optimally inline-expanded program includes no such temporary, which drastically reduces the amount of memory used. Since copying of a very large amount of data is eliminated, processing speed should, in turn, increase.

Source program:

```
A(1:100,1:200) =    SUM( SPREAD( B(1:10,1:100), 3, 200 )
                    + SPREAD( C(1:10,1:200), 2, 100 ), 1 )
```
(Formula 6)

Program obtained by simple conversion:

```
T1(1:10,1:100,1:200) =   SPREAD( B(1:10,1:100), 3, 200 )
T2(1:10,1:100,1:200) =   SPREAD( C(1:10,1:200), 2, 100 )
T3(1:10,1:100,1:200) =   T1(1:10,1:100,1:200)
                         + T2(1:10,1:100,1:200)
A(1:10,1:100,1:200) =    SUM( T3(1:10, 1:100, 1:200), 1)
```
(Formula 7)

Program obtained by optimum inline expansion:

```
DO I=1,100
    DO J=1,200
        S = 0
        DO K=1,10
            S = S + B(K,I) + C(K,J)
        END DO
```
(Formula 8)

-continued

```
      A(I,J) = S
   END DO
END DO
```

In the above program, SUM and SPREAD are intrinsic FORTRAN 90 functions and have the following meanings:

SPREAD has a format SPREAD(SOURCE, DIM, NCOPIES), and generates a dimension-spread array by spreading an array designated by SOURCE in the direction of a DIMth dimension by copying its elements NCOPIES times. In the above example, the equation T1(1:10,1:100, 1:200)=SPREAD (B(1:10,1:100), 3, 300) generates the array T1(1:10,1:100,1:200) by spreading the array B(1:10, 1:100) three-dimensionally and by copying its elements 200 times. As a result, T1(i,j,k) has the same values as B(i,j) over the ranges i=1 to 10, j=1 to 100, and k=1 to 200.

Similarly, the equation T2(1:10,1:100,1:200)=SPREAD (C(1:10,1:200), 2, 100) generates the array T2(1:10,1:100, 1:200) by spreading the array C(1:10,1:200) two-dimensionally by copying its elements 100 times. T2(i,j,k) thus has the same values as C(i,k) over the ranges i=1 to 10, j=1 to 100, and k=1 to 200.

SUM uses a SUM (ARRAY, DIM, MASK) format and generates a dimension-reduced array by summing up, in the direction of a dimension indicated by DIM, elements of a target array indicated by ARRAY having corresponding elements of MASK that are true. DIM and MASK are options. If they are not specified, all elements are added together and a scalar value is returned. In the above example, A(1:100,1:200)=SUM(T3(1:10, 1:100, 1:200), 1) means summing the elements of the array T3(1:10, 1:100, 1:200) in the first dimension. As a result, values T3(1,i,j)+T3(2,i,j)+ . . . . +T3(10,i,j) are substituted into A(i,j) over the range of i=1 to 100, j=1 to 200.

Most conventional inline expansion methods are based on idiom recognition (pattern matching). In this scheme, matching templates and their expansion forms are prepared and a description that matches one of the templates is replaced with the corresponding expansion form. This pattern matching scheme has a problem in that inline expansion code cannot be generated for a description not registered as a pattern or a description that combines registered patterns. It is practically impossible to register, as patterns, all combinations of TIFs and operations on arrays.

Macro-expansion determines how to alleviate the above problem to some extent. According to this scheme, a matching template is described flexibly, and an expansion form can be designated by a program. Although this scheme is more powerful in describing patterns than simple pattern matching, it does not address the essential problem that all patterns must be prepared.

Published Unexamined Patent Publication No. 58-149569 discloses a parallelized processing scheme by using scalar expressions for arrays. Specifically, this publication discloses a scheme in which, in a compiler for generating an object program from a given source program for a vector processor having a plurality of parallel arithmetic units, loops each having a simple variable are classified by checking the busy state of a simple variable for each loop at the entrance and exit of the loop and processing for parallelizing the respective loops is done based on the classification thus obtained. However, this publication does not disclose anything about the expansion of array operations.

OBJECT TO BE ATTAINED BY THE INVENTION

It is therefore the object of the present invention to provide an inline expansion method that can be universally applied to a variety of formulas as combinations of intrinsic array operation functions and array operations without having to prepare individual templates or macros.

The invention enables the processing, in a unified manner, of a program while retaining its meaning rather than replacing a program by template matching or macro-processing on TIFs. By virtue of unified processing, the technique of the invention can optimally inline-expand even a formula as a combination of any type of TIFs, RIFs, and array operations.

In the invention, to compile, as inline expansion, a TIF formula, the entire TIF formula is rendered into a virtual array. A virtual array consists of the following information:

A virtual number of dimensions and index ranges where the number of dimensions and index ranges of a temporary array as a result of an inline expansion of the entire TIF are described.

Index mapping between the virtual array and an actual array where description is provided for the formula used to realize the virtual array from the actual array.

Formula expressing the virtual array (source program information) This is information on the TIF formula in a source program. If inline expansion cannot be done, conversion is made based on this information to call a subroutine corresponding to the TIF.

A TIF is inline-expanded as follows:
(1) Converting the TIF to a virtual array.
(2) Doing inline expansion using the virtual array as is.
(3) Inversely converting the virtual array to an actual array.

In step (1) where the conversion of the TIF to a virtual array is done, the TIF is macro-expanded and mapping to an actual array is generated.

Macro-processing of the present invention differs essentially from the conventional method of inline-expanding the entire description of a user by macro-processing in the following way: while in the conventional method, templates for various combinations of TIFs are prepared in advance, in the method of the present invention, a TIF formula is analyzed during compilation and a template for inline expansion is generated. Furthermore, the template for inline expansion is mapped to an actual array and macro-processing is used in generating the template. According to this method, an arbitrary combination of TIFs can be inline-expanded only by preparing one macro-template for each TIF.

The formula that follows is an example of conversion from a simple SPREAD function to a virtual array. $1 is the name of a virtual array. A formula A($$1) on the right hand side of mapping to an actual array is a macro-template generated during compilation.

(Formula 9)

```
X(1:100,1:10) =   SPREAD( A(1:100), 2, 10)
X(1:100,1:10) =   $1(1:100,1:10)
                  (Name and size of a virtual
                  array)
[ $1($$1,$$2) → A($$1) ]        (Mapping to an actual
                                 array)
   [ SPREAD( A(1:100), 2, 10 ) ]   (Source program)
```

In step (2), where inline expansion is done using the virtual array as is, actual loop code is generated with the virtual array regarded as a simple array. A RIF and an array operator are inline-expanded in this phase. The program of the above formula is inline-expanded using the virtual array as is to produce the following formula:

```
                                                    (Formula 10)
        DO I2=1,10
            DO I1=1,100
                X(I1,I2) = $1(I1,I2)
            END DO
        END DO
```

In step (3), the virtual array included in inline expansion code is converted to mapping to an actual array by using the template generated in step (1). As indicated by the macro-expansion shown in Formula 11, the virtual array is expanded to an actual array access. The entire program becomes as follows:

Macro-expansion:

$$\$1(I1,I2) \to A(I1) \qquad \text{(Formula 11)}$$

Result of inline expansion:

```
                                                    (Formula 12)
        DO I2=1,10
            DO I1=1,100
                X(I1,I2) = A(I1)
            END DO
        END DO
```

BEST MODE FOR CARRYING OUT THE INVENTION

The following is the best mode presently contemplated for carrying out the invention. The descriptions that follow are made assuming that FORTRAN 90 is used as the programming language. More detailed specifications of FORTRAN 90 are described in, for instance, Jeanne C. Adams et al, "FORTRAN 90 Handbook Complete ANSI/ISO Reference," McGraw Hill.

Principle of the invention

1. Virtual array

First, rules are described for determining dimensions of the virtual array to be prepared and the start and end numbers of the array.

Dimensions of a virtual array and their index values are determined from an operation of an array function and an array that is an argument of the array function. It is actually necessary to produce a program for generating a virtual array for each function. The following three items are involved:

Determining the dimensions of a virtual array

Making indices of the virtual array and an actual array correspond

Normalizing of the indices

For example, in the case of a SPREAD function, which spreads only one dimension, as shown below, a virtual array has dimensions that are dimensions of an argument array plus one.

$$\text{SPREAD}( A(100:200), 2, 10) \qquad \text{(Formula 13)}$$

Only a dimension in which SPREAD takes place need be considered for dimensional correspondence. Where the dimension in which SPREAD takes place is a variable, inline expansion of this program will fail. Inline expansion is thus not done and, instead, an ordinary function is called. Where the dimension in which SPREAD takes place is a constant, inline expansion is done. Dimensions smaller than the dimension in which SPREAD takes place are kept the same, and one is added to dimensions larger than it.

Since the argument of the SPREAD function in the above example is a one-dimensional array, the virtual array should have two dimensions. Indices of the respective dimensions are normalized as follows to have a start value of 1:

1:100 for the first dimension

1:10 for the second dimension

It is not always necessary to normalize indices, but normalizing indices improves processing efficiency when array functions having a complex nest structure are rearranged into loops.

2. Generation of macro-templates

Macro-templates are generated from inside nested array functions. First, the innermost virtual array and mapping (template) are generated. Next, an outer template is generated using the innermost template. By thus generating templates recursively outward, macro-templates can be generated for any nest structure.

In the case of an unnested array function, a virtual array and mapping themselves constitute a macro-template.

Macro-template generation is described below in an example including array function MERGE. MERGE is defined as follows:

$$\text{MERGE (TSOURCE, ISOURCE, MASK)} \qquad \text{(Formula 14)}$$

That is, the two arrays TSOURCE and ISOURCE are merged into a single array. An element value of the merged array is that of TSOURCE if the corresponding element value of MASK is true, and is that of ISOURCE if the corresponding element value of MASK is false.

```
                                                          (Formula 15)
    X(201:300) =  MERGE( MERGE( A(1:100), B(1:100),
                  M1(1:100) ), MERGE( C(2:101), D(0:99),
                  M2(3:102), M3(1:100) ) )
```

To deal with this program, a template is first generated for the innermost MERGE function $$\text{MERGE}( A(1:100), B(1:100), M1(1:100)) \qquad \text{(Formula 16)}$$

A template generation rule must be prepared in advance for each array function.

```
                                                          (Formula 17)
    $1(1:100)
        [ $1($$1) ->      if( M1($$1) )
                              A($$1)
                              B($$1)
        ]
```

This is executed by a MERGE function template generation program.

Then, for the second innermost MERGE function, $$\text{MERGE}( C(2:101), D(0,99), M2(1:100)) , \qquad \text{(Formula 18)}$$

The following template is generated:

```
                                                          (Formula 19)
    $2(1:100)
        [ $2($$1) ->      if( M2($$1+2) )
                              C($$1+1)
```

$$D(\$\$1-1)$$
]

Since the indices of a virtual array are normalized to start from 1, access to arrays C and D is described in the above manner.

Further, the outside MERGE function is expanded to the following template:

(Formula 20)
$$\$3(1:100)$$
[ $3 ($$1) -> if ( M3($$1) )
    $1($$1)
    $2($$1)
]

Since $1 and $2 are virtual templates, they are subjected to macro-expansion, finally resulting in the following template:

(Formula 21)
$$\$3(1:100)$$
[ $3($$1)    ->
            if( M3($$1) )
                if( M1($$1) )
                    A($$1)
                    B($$1)
                if( M2($$1+2) )
                    C($$1+1)
                    D($$1-1)
]

The above final template can also be obtained by generating templates from the outside to the inside.

This template generates only one loop ($$ has only one loop variable).

Further, in inline-expanding this template, the indices on the left side must be normalized. The following is thus obtained:

(Formula 22)
```
              DO I1=1,100
IF (M3(I1))   THEN
                IF (M1(I1)) THEN
                    $T1 = A(I1)
                ELSE
                    $T1 = B(I1)
                END IF
              ELSE
                IF (M2(I1 + 2)) THEN
                    $T1 = C(I1 + 1)
                ELSE
                    $T1 = D(I1 - 1)
                END IF
              END IF
              X(I1 + 200) = $T1
END DO
```

The invention is described below using specific examples.

The specific examples are typical ones in which FORTRAN 90 TIFs are used in a composite manner. These examples are such that inline expansion cannot be done using a method preparing templates in advance.

Example 1

Reduction of SPREAD function+SPREAD function by SUM

This example is such that inline expansion can be done by generating a relatively simple template. A virtual array $1($$1,$$2,$$3), obtained by a first SPREAD function, is actually replaced by accessing B($$1,$$2). Similarly, a virtual array, obtained by a second SPREAD function, is replaced by C($$1,$$2). Template generation is done in step (1), below.

Source program:

(Formula 23)
A(1:100,1:200) = SUM( SPREAD( B(1:10,1:200), 2, 100 ) + SPREAD( C(1:10,1:100), 3, 200 ), 1 )

(1) Program after conversion to virtual arrays:

(Formula 24)
A(1:100,1:200) = SUM( $1(1:10,1:100,1:200)
    [ $1($$1,$$2,$$3) -> B($$1,$$3) ]
    [ SPREAD( B(1:10,1:200), 2, 100 ) ]
    +
    $2(1:10,1:100,1:200)
    [ $2($$1,$$2,$$3) ->
        C($$1,$$2) ]
    [ SPREAD( C(1:10,1:200), 3, 200 ) ]
    , 1 )

(2) Inline expansion code using virtual arrays as is:

(Formula 25)
```
DO I2=1,200
    DO I1=1,100
        $SUM = 0
        DO ISUM=1,10
            $SUM = $SUM + $1(ISUM,I1,I2) +
                $2(ISUM,I1,I2)
        END DO
        A(I1,I2) = $SUM
    END DO
END DO
```

The temporal variable $SUM appears in the above code because the source code include SUM. That is, 8SUM is prepared to store values of the function SUM. (3) Inline expansion codes after inverse conversion to actual arrays:

(Formula 26)
```
DO I2=1,200
    DO I1=1,100
        $SUM = 0
        DO ISUM=1,10
            $SUM = $SUM + B(ISUM,I1) + C(ISUM,I2)
        END DO
        A(I1,I2) = $SUM
    END DO
END DO
```

In step (2), the SUM function is inline-expanded as a reduction function.

The following macro-expansion is done in the final step (3) of the method under discussion because the following indices are used in actual arrays:

$1 (ISUM, I1, I2)→B (ISUM, I2)     (Formula 27)

$2 (ISUM,I1,I2)→C(ISUM, I1)

Optimally inline-expanded code is thus finally obtained.

Example 2

Oblique shifting of arrays (CSHIFT of CSHIFT)

In this example, a more complex template is generated in step (1). Nested TIF functions are evaluated from the inside. CSHIFT is defined as follows:

CSHIFT(ARRAY, SHIFT, DIM)　　　　　　　(Formula 28)

This circular shift function of elements serves to shift the dimension indicated by DIM of the target array indicated by ARRAY by the number indicated by SHIFT. End portions are circulated.

Source program:

$$X(1:100,1:200) = \text{CSHIFT}(\text{CSHIFT}(Y(1:100,1:200), \text{dim}=2, \text{shift}=1), \text{dim}=1, \text{shift}=-1) \quad \text{(Formula 29)}$$

(1) Program after conversion to virtual arrays:

```
                                                    (Formula 30)
X(1:100,1:200) =  $1( 1:100,1:200 ))
                  [ $1($$1,$$2) ->
                      if( $$1-1 < 1 )
                          if( $$2+1 > 100 )
                              Y(100, 1)
                              Y(100, $$2+1)
                          if( $$2+1 > 100 )
                              Y($$1-1, 1)
                              Y($$1-1, $$2+1)
                      ]
                  ] CSHIFT( CSHIFT( Y(1:100,1:200),
  dim=2, shift=1 ),
                      dim=1, shift =-1 )
                  ]
```

(2) Inline-expanded code using virtual arrays as is:

```
                                  (Formula 31)
DO I2=1,200
    DO I1=1,100
        $T1 = $1(I1,I2)
        X(I1,I2) = $T1
    END DO
END DO
```

(3) Inline expansion code after inverse conversion to actual arrays:

```
                                  (Formula 32)
DO I2=1,200
    DO I1=1,100
        IF (I1-1) < 1 THEN
            IF (I2+1) > 200
                $T1 = Y(100,1)
            ELSE
                $T1 = Y(100,I2+1)
            END IF
        ELSE
            IF (I2+1) > U2 THEN
                $T1 = Y(I1-1,1)
            ELSE
                $T1 = Y(I1-1,I2+1)
            END IF
        END IF
        X(I1,I2) = $T1
    END DO
END DO
```

In the above formulas,

```
                                                (Formula 33)
For CSHIFT( Y(1:100,1:200), dim=2, shift=1 ),
    [ $1($$1,$$2) -> if ( $$2+1 > 100 )
        Y($$1, 1)
        Y($$1, $$2+1)
    ]
```

The "if" operator used above describes a condition. The "if" operator takes the first value if the specified condition is true and the second value if it is false. In the above example, the index of the second dimension is shifted by 1. If the shifted result exceeds 100, the index is changed to 1 and array Y is accessed.

With the above macro-template, the following more complex macro-template is generated for the CSHIFT function located further outside:

```
                                            (Formula 34)
[ $1($$1,$$2) ->        if ( $$1-1 < 1 )
                            if ( $$2+1 > 100 )
                                Y(100, 1)
                                Y(100, $$2+1)
                            if ( $$2+1 > 100 )
                                Y($$1-1, 1)
                                Y($$1-1, $$2+1)
]
```

Optimally inline-expanded code is obtained in step (3) by using the above template.

Example 3

Merging of four arrays in a tournament manner by using three masks

Nested TIF functions MERGE are used also in the following example:

Source program:

```
                                                    (Formula 35)
X(1:100) = MERGE( MERGE( A(1:100), B(1:100), M1(1:100)
                    MERGE( C(1:100), D(1:100), M2(1:100)
M3(1:100) )
```

(1) Program after conversion to virtual arrays:

```
                                  (Formula 36)
X(1:100) = $1(1:100)
           [ $1($$1) ->
               if( M3($$1) )
                   if( M1($$1) )
                       A($$1)
                       B($$1)
                   if( M2($$1) )
                       C($$1)
                       D($$1)
           ]
           [ MERGE( MERGE( A(100), B(100), M1(100) ),
                    MERGE( C(100), D(100), M2(100) ),
  M3(100) )
           ]
```

(2) Inline expansion code using virtual arrays as is:

```
                                  (Formula 37)
DO I1=1,100
    $T1 = $1(I1)
    X(I1) = $T1
END DO
```

(3) Inline expansion code after inverse conversion to actual arrays:

```
                                                (Formula 38)
DO I1=1,100
        IF (M3(I1)) THEN
              IF (M1 (I1)) THEN
                    $T1 = A(I1)
              ELSE
                    $T1 = B(I1)
              END IF
        ELSE
              IF (M2(I1)) THEN
                    $T1 = C(I1)
              ELSE
                    $T1 = D(I1)
              END IF
        END IF
        X(I1) = $T1
END IF
```

The above example is explained below. The following template is generated for the first inside MERGE function:

```
                                                (Formula 39)
[ $3($$1) -> if( M1($$1) )
                    A($$1)
                    B($$1)
]
```

Similarly, the following template is generated for the second inside MERGE function:

```
                                                (Formula 40)
[ $2 ($$1) -> if ( M1 ($$1) )
                    A($$1)
                    B($$1)
]
```

The outside MERGE function is expanded to the following template:

```
                                                (Formula 41)
[ $1($$1) -> if( M1 ($$1) )
                    $3($$1)
                    $2($$1)
]
```

The following template is finally obtained:

```
                                                (Formula 42)
[ $1(1$$1) ->
              if( M3($$1) )
                    if( M1($$1) )
                          A($$1)
                          B($$1)
                    if( M2($$1) )
                          C($$1)
                          D($$1)
]
```

Although the above descriptions are directed to SPREAD, SUM, MERGE and CSHIFT, which are FORTRAN 90 array operation functions, the invention is not limited to these functions but can be applied to source code including the dimension-reduction function of ALL, ANY, COUNT, MAXVAL, MINVAL, and PRODUCT; array constituting functions of PACK and UNPACK; array shaping functions of RESHAPE; array operation functions of EOSHIFT and TRANSPOSE; array position functions of MAXLOC and MINLOC; and a combination of any of these functions. For details on these functions, refer to, for instance, the above-mentioned publication by Jeanne C. Adams et al., "FORTRAN 90 Handbook Complete ANSI/ISO Reference, "McGraw Hill. A person of ordinary skill in the art could construct a system so that it generates templates for the respective functions based on the above examples of macro-templates for SPREAD, CSHIFT, SUM, and MERGE.

The invention can be applied both to FORTRAN 90 and languages having functions for directly operating on arrays, such as APL, HPF (a parallel processing language based on FORTRAN 90), and C* (a parallel processing language based on C).

The invention is essentially intended for inline expansion and its use is not limited to scalar processors. Since intrinsic functions can be converted to loops by inline expansion, these entire loops can be parallelized efficiently. Therefore, the invention can sufficiently improve processing efficiency even when applied to a compiler for a parallel processor.

As described above, according to the invention, even a complex formula in which TIFs and RIFs are nested can be optimally inline-expanded by preparing a template for each TIF or RIF and applying templates to a temporal formula obtained from source code that includes arrays, TIFs, and RIFs by conversion to virtual arrays.

A number of examples of the present invention have been described. Nevertheless, it will be understood that various modifications may be made without departing from the spirit and the scope of the present invention. Accordingly, it is to be understood that the invention is not to be limited by the specific illustrated examples, but only by the scope of the appended claims.

We claim:

1. In a computer system having a compiler for generating an object code from a source code, said computer having a processor and a storage means, a method for inline expansion, in said compiler, for a programming language having array functions, comprising the steps of:

(a) converting, using said compiler, said array functions into virtual arrays, said converting step includes macro-expansion of said array functions and generating mapping functions from said virtual arrays to actual arrays;

(b) inline-expanding said virtual arrays; and (c) inversely converting said inline-expanded virtual arrays into actual arrays using said mapping functions.

2. An inline expansion method as recited in claim 1, wherein said programming language is Fortran 90 and said array functions are transformational intrinsic functions.

3. An inline expansion method as recited in claim 2, wherein said transformational intrinsic functions are SPREAD or CSHIFT functions.

4. An inline expansion method as recited in claim 1, wherein said programming language is Fortran 90 and said array functions are reduction intrinsic functions.

5. An inline expansion method as recited in claim 4, wherein said reduction intrinsic function is a MERGE function.

6. An inline expansion method as recited in claim 1, wherein said inversely converting step is performed by using macrotemplates generated by analyzing individual transformational intrinsic functions.

7. In a computer system having a compiler for generating an object code from a source code, said computer having a processor and a storage means, a method for inline expansion, in said compiler, for a programming language having array functions, comprising the steps of:

(a) creating, using said compiler, for individual array function, a function for converting said individual array function to a virtual array and a function for generating a macro-template based on a transformational intrinsic function or reduction intrinsic function in said source code;

(b) finding, using said compiler, a formula included in said individual array function in said source code;

(c) converting said formula to a formula included in said virtual array using a function for converting said formula to a formula in said virtual array;

(d) generating a macro-template for converting said virtual array to an actual array based on said transformational intrinsic function or reduction intrinsic function in said source code;

(e) inline-expanding said formula included in said virtual array; and (f) inversely converting said virtual array in said inline-expanded formula to said actual array using said macro-template.

8. An inline expansion method as recited in claim 7, wherein said function for converting said individual array function to said virtual array includes a function determining said virtual array dimensions and making said virtual array indices and indices for corresponding actual array.

9. An inline expansion method as recited in claim 7, further comprising the step of generating, in response to the existence of nested array functions, macro-templates for nested array functions, and generating, as a result, said macro-templates to be used for inversely converting the virtual array in said inline expanded formula to said actual array by sequentially applying a macro-template generated for an array function occupying an inside position in a nested structure to a macro-template generated for an array function occupying an outside position in said nested structure.

10. An inline expansion method as recited in claim 7, further comprising the step of generating, in response to the existence of said nested array functions, macro-templates for respective said nested array functions, and generating, as a result, macro-templates to be used for inversely converting said virtual array in said inline expanded formula to said actual array by sequentially applying a macro-template generated for an array function occupying an outside position in said nested structure to a macro-template generated for an array function occupying an inside position in said nested structure.

* * * * *